(12) United States Patent
Wei et al.

(10) Patent No.: US 9,405,483 B1
(45) Date of Patent: Aug. 2, 2016

(54) OPTIMIZED WRITE PERFORMANCE AT BLOCK-BASED STORAGE DURING VOLUME SNAPSHOT OPERATIONS

(71) Applicant: Amazon Technologies, Inc., Reno, NV (US)

(72) Inventors: Danny Wei, Seattle, WA (US); Nandakumar Gopalakrishnan, Seattle, WA (US); Jiahua He, Sunnyvale, CA (US); John Luther Guthrie, II, Seattle, WA (US); James Michael Thompson, Seattle, WA (US); Jianhua Fan, Seattle, WA (US); Fnu Amit Anand Amleshwaram, Seattle, WA (US); Kerry Quintin Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 192 days.

(21) Appl. No.: 14/205,046

(22) Filed: Mar. 11, 2014

(51) Int. Cl.
*G06F 3/06* (2006.01)
(52) U.S. Cl.
CPC .............. *G06F 3/065* (2013.01); *G06F 3/0608* (2013.01); *G06F 3/0683* (2013.01)
(58) Field of Classification Search
CPC ...... G06F 3/065; G06F 3/0608; G06F 3/0683
See application file for complete search history.

(56) References Cited

U.S. PATENT DOCUMENTS

| | | | | |
|---|---|---|---|---|
| 5,815,649 | A | * | 9/1998 | Utter ................... G06F 11/2071 709/215 |
| 7,953,947 | B2 | | 5/2011 | Akutsu et al. |
| 8,307,154 | B2 | | 11/2012 | Stabrawa et al. |
| 8,321,642 | B1 | | 11/2012 | Anzai et al. |
| 8,595,191 | B2 | | 11/2013 | Prahlad et al. |
| 2006/0155946 | A1 | * | 7/2006 | Ji ............................ G06F 3/0617 711/162 |
| 2012/0290802 | A1 | | 11/2012 | Wade et al. |
| 2013/0007389 | A1 | * | 1/2013 | Patterson ................ G06F 3/061 711/162 |

\* cited by examiner

*Primary Examiner* — Eric S Cardwell
(74) *Attorney, Agent, or Firm* — Robert C. Kowert; Meyertons, Hood, Kivlin, Kowert & Goetzel, P.C.

(57) ABSTRACT

Write optimization for block-based storage performing snapshot operations may be implemented. Write requests for a particular data volume may be received for which a snapshot operation is in progress. A determination may be made as to whether a data chunk of the data volume modified as part of the write request has not yet been stored to a remote snapshot data store as part of the snapshot operation. For a data chunk that is to be modified and that has not yet been stored, the data chunk may be stored in a local in-memory volume snapshot buffer. Once the data chunk is stored in the in-memory volume snapshot buffer, the write request may be performed and acknowledged as complete. The data chunk may be sent to the remote snapshot data store asynchronously with regard to the acknowledgment of the write request.

20 Claims, 11 Drawing Sheets

OPTIMIZED WRITE PERFORMANCE AT BLOCK-BASED STORAGE DURING VOLUME SNAPSHOT OPERATIONS

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are frequently supported by block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. However, as network transmission capabilities increase, along with greater processing capacity for virtualized resources, I/O demands upon block-based storage may grow. If I/O demands exceed the capacity of block-based storage to service requests, then latency and/or durability of block-based storage performance for virtualized computing resources suffer.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement optimized write performance for block-based storage performing snapshot operations, according to various embodiments. Data volumes maintained in block-based storage may provide a logical presentation of block data that may be accessed by a storage client. Various different storage operations, such as input/output (I/O) operations (e.g., read/write requests) may be performed with respect to a data volume. It may be desirable to preserve the state of a data volume at certain points in time, such as for recovery operations, or historical or analytical operations. Snapshot operations may capture a point-in-time state of a data volume as a snapshot that may be stored separately from the data volume for future use. Multiple snapshot operations may be performed for the same data volume at different times.

Snapshot operations may often prove to be costly with regard to the performance of other storage operations (e.g., I/O operations) for a data volume undergoing a snapshot operation. As the state of the data of the data volume at the time associated with the snapshot may need to be preserved until it is copied into the snapshot, changes to the data volume may be blocked, dropped, or otherwise delayed from completion. Although capturing snapshots of a data volume may be beneficial for other operations, the performance impact on I/O operations may discourage and/or prevent the capture of snapshots operations, such as for applications with I/O intensive workloads making use of data volumes in block-based storage.

Figure 1:
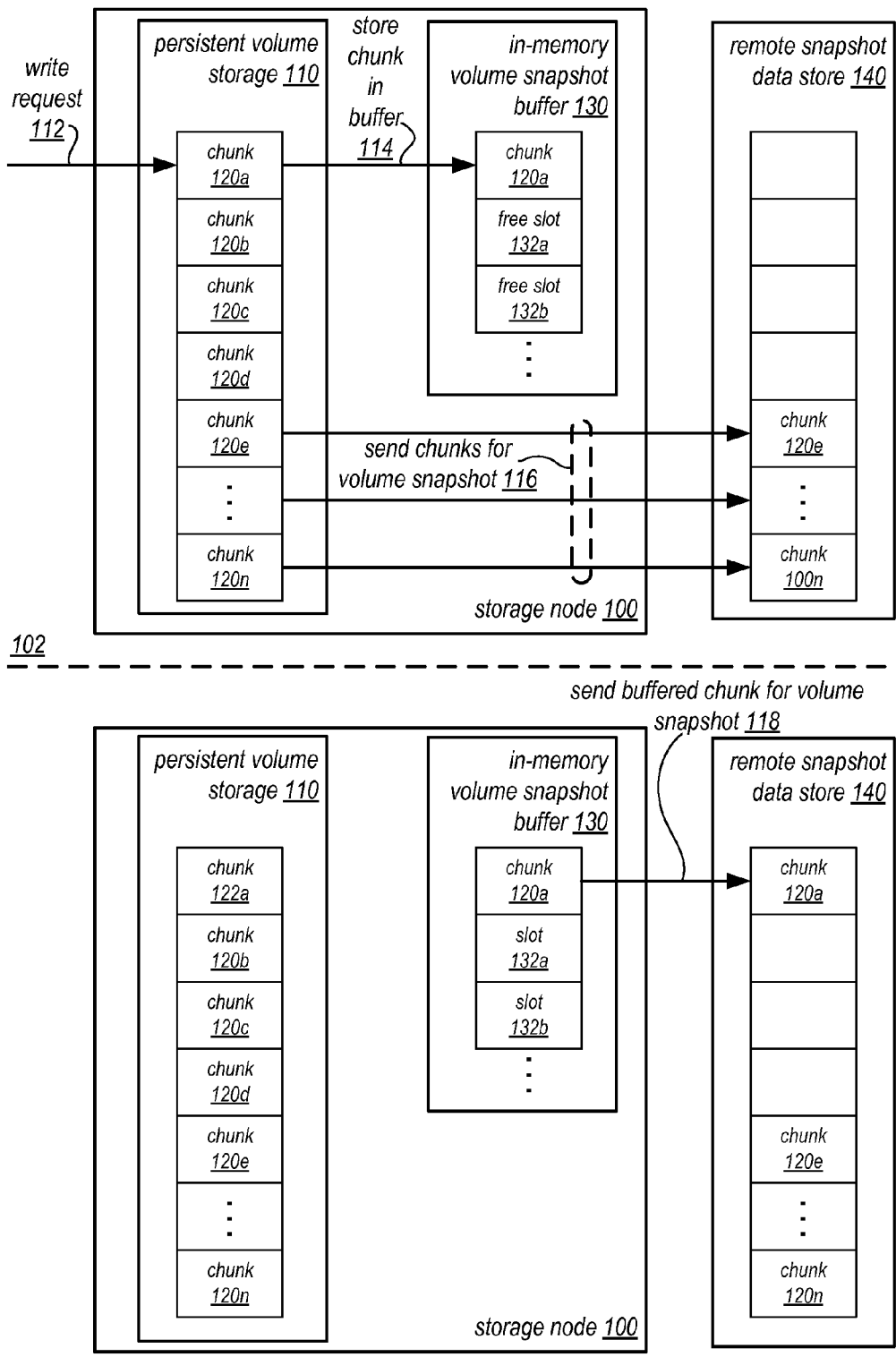
FIG. 1 is series of block diagrams illustrating optimized write performance at block-based storage during snapshot operations, according to some embodiments.

FIG. 1 is series of block diagrams illustrating optimized write performance at block-based storage during snapshot operations, according to some embodiments. As illustrated in scene 102, a data volume may be maintained in persistent volume storage 110 at storage node 100 (e.g., a storage service or other computing system or device, such as computing system 2000 described below with regard to FIG. 11). Persistent volume storage 110 may be one or more block-based storage devices (e.g., hard disk drives or solid state drives). The data volume may be divided into data chunks (e.g., different portions of the data volume), such as data chunks 120a, 120b, 120c, 120d, 120e through 120n. A snapshot operation may be performed to store a snapshot of the data volume, copying data chunks 120 from persistent volume to remote snapshot data store 140.

As illustrated in FIG. 1, data chunks 120e through 120n have already been sent 116 to remote snapshot data store 140 (which may be a data store remote from storage node 100). While the snapshot operation is in progress, write requests 112 may also be received at storage node 100. For write requests to those data chunks that have yet to be stored in remote snapshot data store 140, such as a write request to data chunk 120a, data chunk 120a may be stored 114 in a storage slot in in-memory volume snapshot buffer 130, which may be a portion of system memory or other memory device local to storage node 100. Once stored in the in-memory volume snapshot buffer 130, the write request may be performed at persistent volume storage 110 to update data chunk 120a, and then acknowledged as complete, as the version of the data associated with the ongoing snapshot operation is still preserved. By storing the data chunk in the in-memory volume snapshot buffer 130, the write request may be completed, in various embodiments, without blocking the write request until data chunk 120a is stored in remote snapshot data store 140. As illustrated in FIG. 1, in-memory volume snapshot buffer 130 has other available storage space to store other data chunks, such as free slot 132a and free slot 132b. However, if no storage space for a data chunk were to be available in in-memory volume snapshot buffer, various different actions might be taken (as described in further detail below with regard to FIG. 9), such as blocking the write request and/or aborting the snapshot operation.

Figure 8:
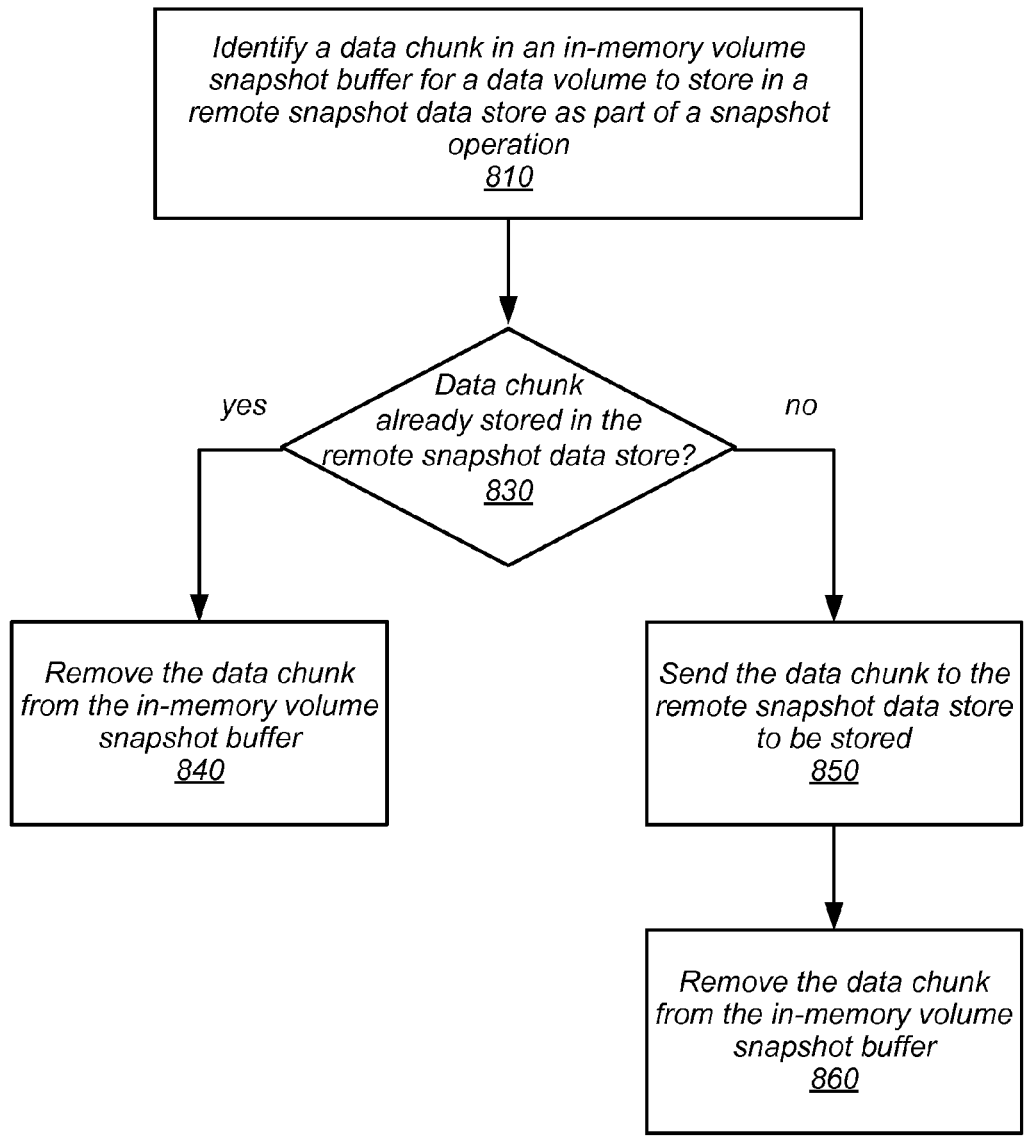
FIG. 8 is a high-level flowchart illustrating various methods and techniques for copying data chunks maintained in an in-memory volume snapshot buffer to a remote snapshot data store, according to some embodiments.

As illustrated in scene 104, the snapshot operation may carry on copying data chunks to remote snapshot data store 140 without regard to write requests received at storage node, in various embodiments. Data chunk 120 may be sent 118 from in-memory volume snapshot buffer 130 to remote snapshot data store 140 asynchronously from performing and acknowledging write request 112. Once stored in remote snapshot data store 140, the space storing data chunk 120a in in-memory volume snapshot buffer 130 may be reclaimed and made free to store another data chunk. FIG. 8, discussed in more detail below, provides different examples and techniques for selecting and sending data chunks from an in-memory volume snapshot buffer to a remote snapshot data store.

Please note that previous descriptions are not intended to be limiting, but are merely provided as an example of storage nodes that provide block-based storage implementing write optimizations during snapshot operations. For example, multiple storage nodes may maintain replicas of a same data volume, and implement write optimization at each of the storage nodes maintaining replicas of the data volume. Other differences, for example, such as the number of data chunks in a data volume or the number of available storage slots for data chunks in the in-memory volume snapshot buffer may also be different than illustrated in FIG. 1.

This specification begins with a general description of a provider network implementing a block-based storage service for volume clients, such as virtual instances of a virtual computing resource provider. Storage nodes for the block-based storage service may implement write optimization during snapshot operations, in some embodiments. Then various examples of a block-based storage service are discussed, including different components/modules, or arrangements of components/module that may be employed as part of implementing a block-based storage service. A number of different methods and techniques to optimize write performance for block-based storage during snapshot operations are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
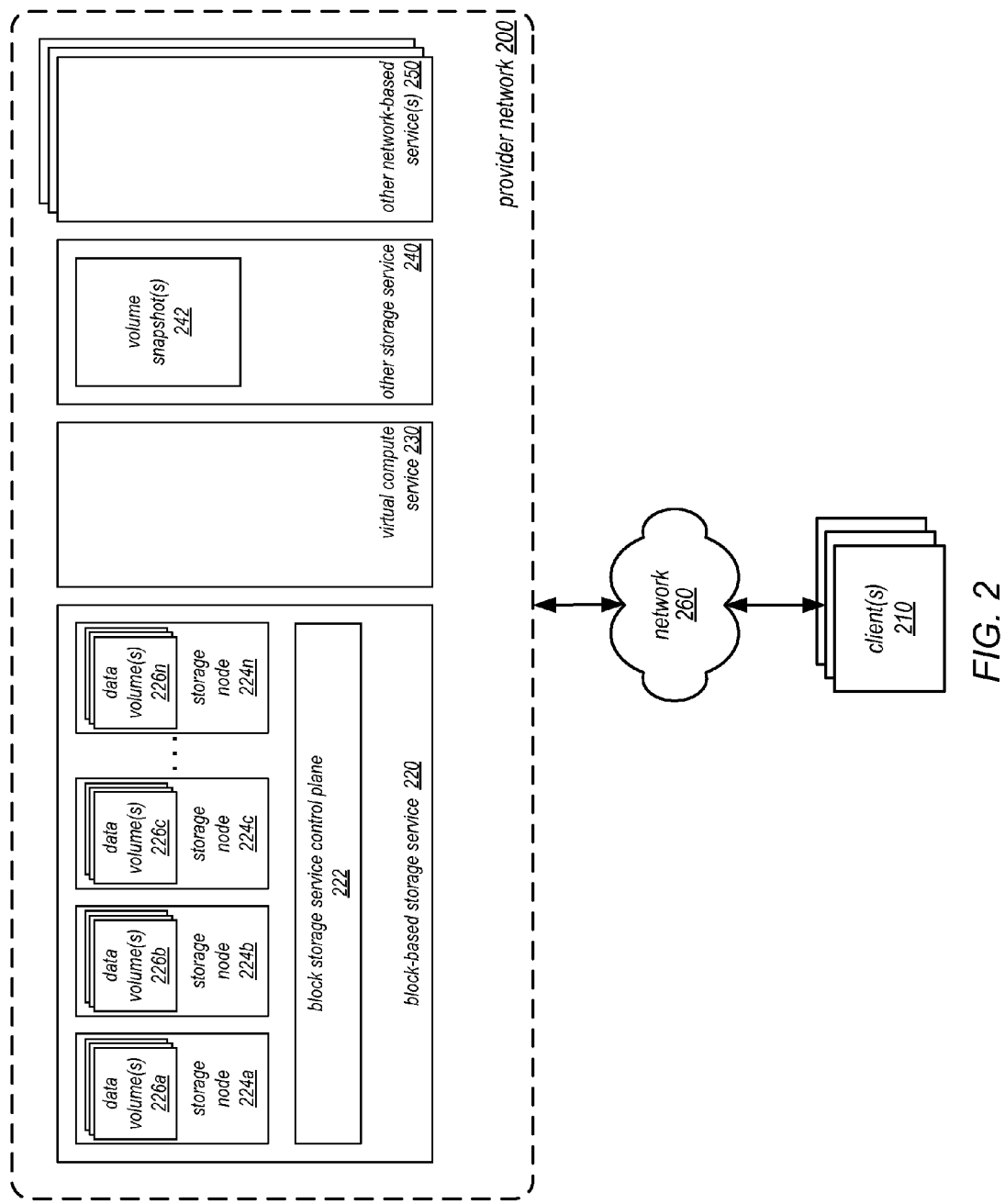
FIG. 2 is a block diagram illustrating a provider network implementing multiple network-based services including a block-based storage service that implements optimized write performance during snapshot operations, according to some embodiments.

FIG. 2 is a block diagram illustrating a provider network implementing multiple network-based services including a block-based storage service that implements optimized write performance during snapshot operations, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including general purpose or special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent storage nodes 224a, 224b, 224c through 224n(e.g., server block data storage systems), which provide block level storage for storing one or more sets of data volumes data volume(s) 226a, 226b, 226c, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations.

A volume snapshot of a data volume 226 may be a fixed point-in-time representation of the state of the data volume 226. In some embodiments, volume snapshots 242 may be stored remotely from a storage node 224 maintaining a data volume, such as in another storage service 240. Snapshot operations may be performed to send, copy, and/or otherwise preserve the snapshot of a given data volume in another storage location, such as a remote snapshot data store in other storage service 240 over various different internal or external communication systems, devices, or networks implemented as part of provider network 200.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. Block-based storage service control plane 222 may also provide services related to the creation, usage and deletion of volume snapshots 242 on other storage service 240. Block-based storage service control plane 222 may also provide services related to the collection and processing of performance and auditing data related to the use of data volumes 226 and snapshots 242 of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots 242 of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Block-based storage service 220 may manage and maintain data volumes 226 in a variety of different ways. Different durability schemes may be implemented for some data volumes among two or more storage nodes maintaining a replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For storage nodes providing write optimization during a snapshot operation, additional coordination may be implemented.

Figure 3:
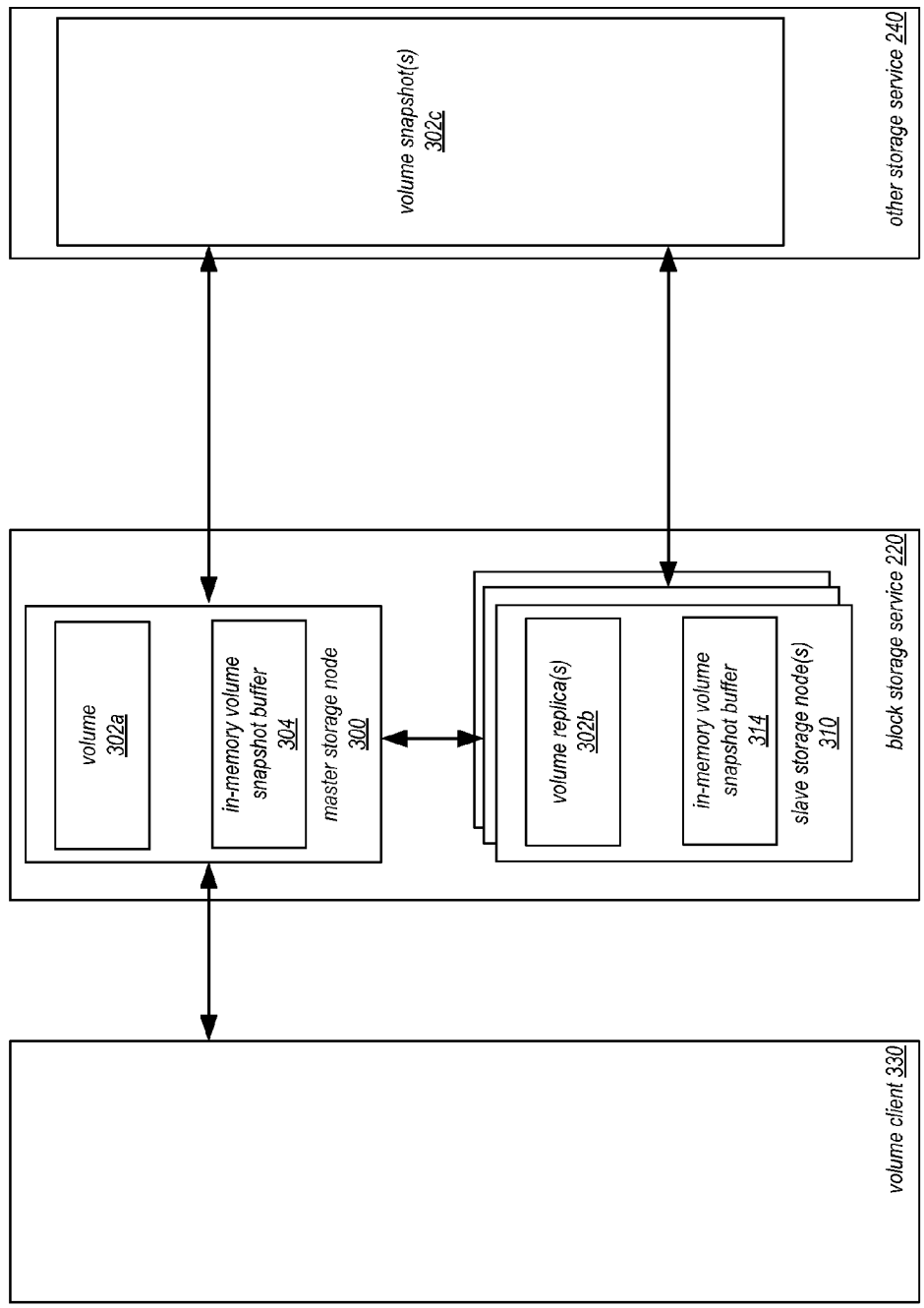
FIG. 3 is a block diagram illustrating a master storage node and slave storage node(s) implementing an in-memory volume snapshot buffer for optimized write requests for a particular data volume, according to some embodiments.

FIG. 3 is a block diagram illustrating a master storage node and slave storage node(s) implementing an in-memory volume snapshot buffer for optimized write requests for a particular data volume, according to some embodiments. Data volume 302a may be maintained as one of multiple data volumes maintained on a storage node 300. A storage node, whether master storage node 300 or slave storage node(s) 310 may be one or more computing systems or devices, such as a storage server or other computing system (e.g., computing system 2000 described below with regard to FIG. 11). For a given data volume 302, storage node 300 may serve as a master storage node 300. Master storage node 300 may, in various embodiments, receive and process requests from volume clients 330 (as illustrated in FIG. 3). Master storage node 300 may then coordinate replication of I/O requests, such as write requests, or any other changes or modifications to data volume 302a to one or more other storage nodes 310 serving as slave storage nodes, and/or direct the performance of other volume client 330 requests, such as snapshot operations or other I/O operations such as serving a read request.

In various embodiments, master storage node 300 (and/or slave storage node(s) 310) may be configured to process various volume client 330 requests according to one or more interfaces, communication protocols, or other techniques. For example, in some embodiments, block-based storage service 220 may implement an application programming interface (API) which may allow volume clients 330 to perform various storage operations for a particular data volume. In some embodiments, master storage node 300 may be configured to process requests from volume clients 330 via a storage communication protocol, such as internet small computer system interface (iSCSI). Although illustrated as single entity, volume client 330 may be a virtual compute instance, such as may be provided by virtual compute service 230 in FIG. 2, a client 210 of provider network 200 (e.g., requesting a data volume snapshot), or other component of block-based storage service 220 (e.g., block-based storage service control plane 222).

Figure 9:
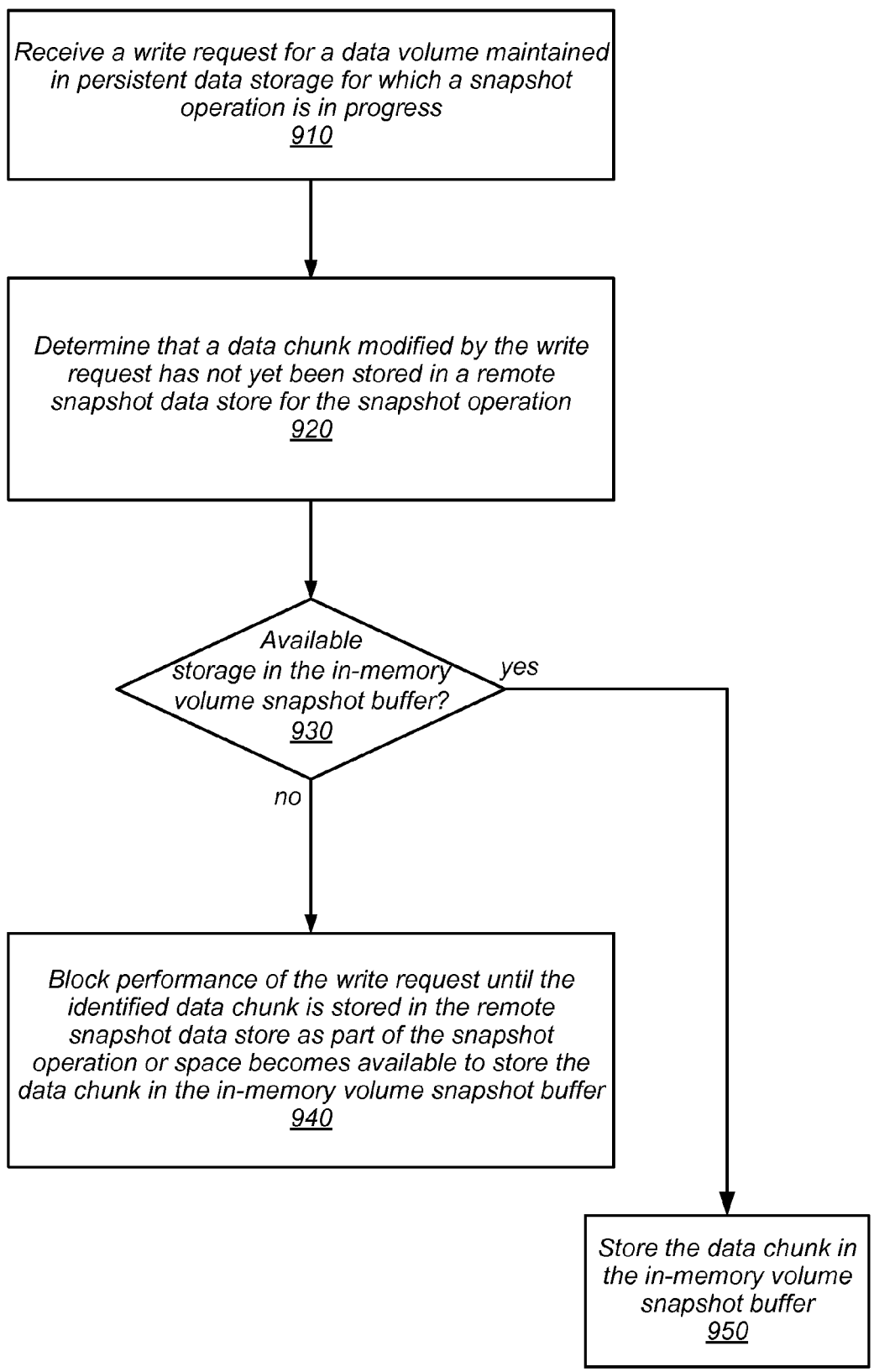
FIG. 9 is a high-level flowchart illustrating various methods and techniques for handling write requests with a full in-memory volume snapshot buffer, according to some embodiments.

Master storage node 300 and/or slave storage node(s) 310 may, in some embodiments, be configured to communicate with other storage systems or devices remote from the respective storage nodes, such as other storage service 240. Specifically, volume snapshots 302c of data volumes maintained at master storage node 300 and slave storage node(s) 310, such as data volume 302a, may be sent to other storage service 240 to be stored. Thus, master storage node 300 and/or slave storage node(s) may be configured to perform snapshot operations. A snapshot operation, as discussed below with regard to FIGS. 5A and 5B, as well as the various methods and techniques discussed below with regard to FIG. 8, may include storing a state of a data volume at a point-in-time to other data storage 240. Various different request, store, write, copy, or other messages may be sent to other data storage service 240 in order to store volume snapshot(s) 302c. In various embodiments, data volumes may be divided into data chunks, such that a snapshot operation may send the respective data chunks of a data volume to the other storage service to be stored as part of a particular volume snapshot 302c. Once all of the data chunks are stored in the snapshot in other storage service 240, then the snapshot operation may be considered complete/committed (and/or acknowledged to a requesting volume client 330). FIG. 9, described in detail below, provides examples of various different techniques master storage node 300 and/or slave storage node(s) 310 may implement to determine whether a snapshot operation is complete.

During a snapshot operation, such as for data volume 302a, write requests for data volume 302a may be received at master storage node 310 from volume client 330. These write requests may modify data in a data chunk in data volume 302a. If the data chunk remains to be stored in the volume snapshot 302c in other storage, then modifying the data chunk would violate the point-in-time state of the snapshot 302c for data volume 302a. Thus, in various embodiments master storage node 300 and/or slave storage node(s) 310 may implement write optimization for write requests received during a snapshot operation. System or other memory implemented at master storage node 300 and slave storage node(s) may include in-memory volume snapshot volume buffers 304 and 314 respectively. In some embodiments, in-memory volume snapshot buffers 304 and 314 may include one or more slots, or other type of allocated storage spaces for data chunks (e.g., a 256 MB in-memory volume snapshot buffer may allocate 64 slots for 4 MB data chunks). The system or other memory device implementing in-memory volume snapshot buffers 304 and 314 may not be persistent storage (that is in the event of system failure, such as a power failure, data in the memory device may be lost). Alternatively, in some embodiments, the system memory may be persistent, such as NV-RAM, or other type of battery-backed RAM, as well as various other types of memristor based resistive random access memory (ReRAM), three-dimensional NAND technologies, Ferroelectric RAM, magnetoresistive RAM (MRAM), or any of various types of phase change memory (PCM) may be used to maintain the in-memory volume snapshot buffer.

Figure 4A:
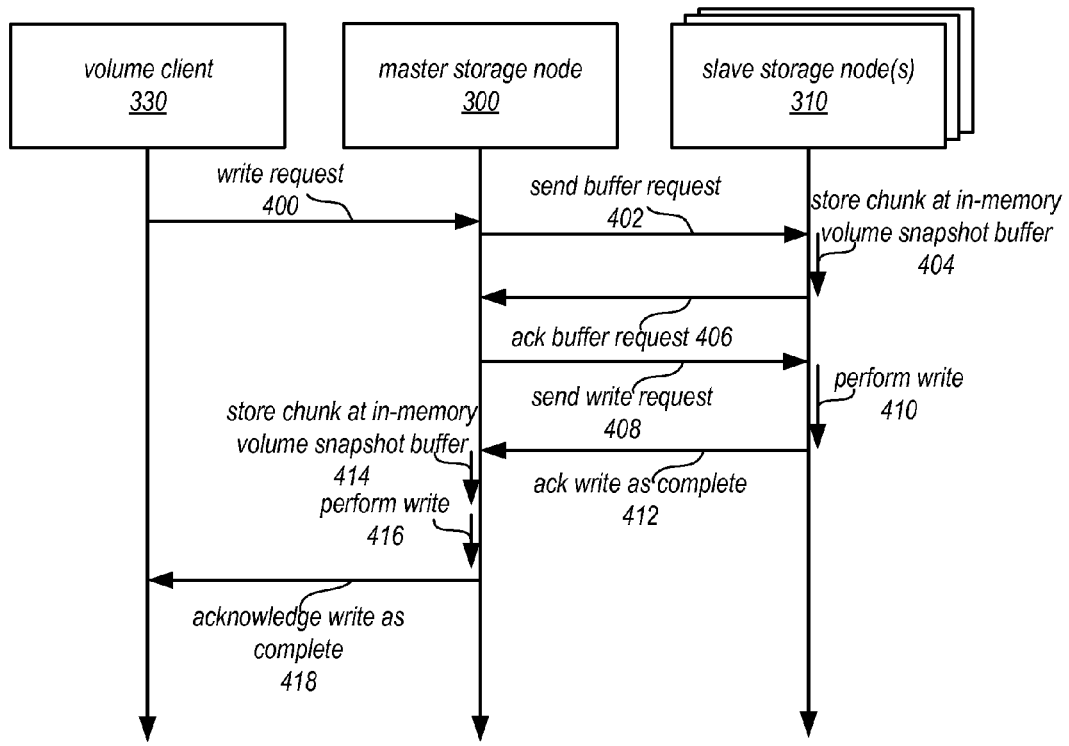
FIGS. 4A and 4B are block diagrams illustrating interactions among a client, a master storage node maintaining a data volume, and slave storage nodes maintaining a replica of the data volume in order to perform optimized writes during a snapshot operation for the data volume, according to some embodiments.
Figure 4B:
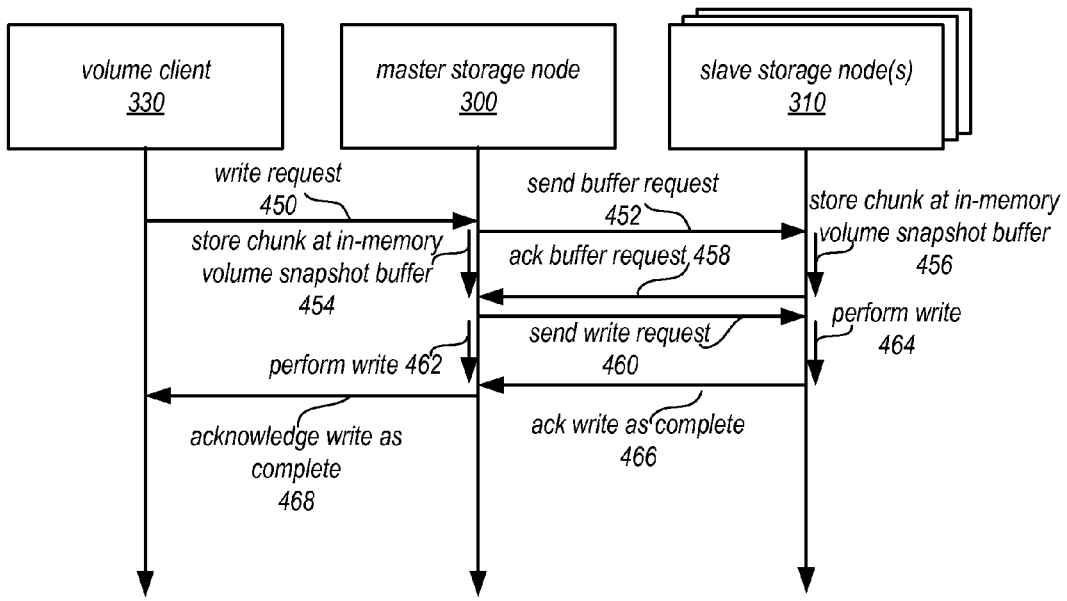

FIGS. 4A and 4B are block diagrams illustrating interactions among a client, a master storage node maintaining a data volume, and slave storage nodes maintaining a replica of the data volume in order to perform optimized writes during a snapshot operation for the data volume, according to some embodiments. In FIG. 4A, volume client 330 may send various I/O requests to a master storage node maintaining a data volume for a client. For instance, client 330 may send a write request 400 to master storage node 300 to modify data in the data volume. The particular data modified may be located in a particular data chunk of the data volume maintained at the master storage node 300. As part of a durability scheme for the data volume, master storage node 300 may then replicate the write request at one or more other slave storage node(s) 310 also maintaining a replica of the data volume. In some embodiments, for write requests that modify a data chunk that remains to be stored in a remote snapshot data store, a write request 410 may indicate that the data chunk remains to be stored in the remote snapshot data store, and may instruct the slave storage node(s) 310 to store the unmodified data chunk in an in-memory volume snapshot buffer local to the slave storage node(s) 310. In some embodiments, additional messaging may be sent. For example, master storage node 300 may first send a buffer request 402 to slave storage node(s) 310 indicating the data chunk to store in the in-memory volume snapshot buffer. In response, slave node(s) 310 may store the data chunk in respective in-memory volume snapshot buffers 404 at the slave node(s) 310 and then may send an acknowledgement of the buffer request 406 to the master storage node 300. Master storage node 300 may then send the write request 408 to slave storage node(s) 310 to be replicated. Slave storage node(s) 310 may then perform the write 410 and acknowledge the write as complete 412 to master storage node 300. In various embodiments, in response, master storage node 300 may then store the data chunk at its own respective in-memory volume snapshot buffer 414 and perform the write request to update the data chunk 416. Master storage node 300 may then send an acknowledgement 418 to volume client 330 indicating that the write is complete. A similar write path may be followed for write requests that modify data chunks that have already been stored in the remote snapshot data store, without storing the unmodified data chunk in the in-memory volume snapshot buffers at the slave storage node(s) 310 and the master storage node 300.

FIG. 4B illustrates a similar scenario. Write requests, however, and resultant storage of data chunks in the in-memory volume snapshot buffer may be performed in parallel or near parallel at master and slave storage node(s). For example, write request 450 is received from volume client 330 at master storage node 300. If a data chunk modified by the write request is determined to be not yet sent to a remote snapshot data store, then a buffer request 452 may be sent to slave storage node(s) 310 indicating the data chunk to be stored in the respective local in-memory volume snapshot buffers at the slave storage node(s) 310. Meanwhile, master storage node 300 may also store the unmodified data chunk from persistent storage to the in-memory volume snapshot buffer 454. Slave storage node(s) 310 may also store the unmodified data chunk at in-memory volume snapshot buffers 456 respectively. When slave storage node(s) 310 complete storing the data chunk in the in-memory volume snapshot buffer, an acknowledgment 458 may be sent to master storage node 300. Master storage node 300 may then, in some embodiments, forward the write request 460 to slave storage node(s) 310. Both master storage node 300 and slave storage node(s) 310 may begin performed the write request to modify the data chunk in persistent storage, as indicated at 462 and 464. Slave storage node(s) 310 may acknowledge completion of the write 466 to master storage node 300. In response to performing the write 462 and receiving the completion acknowledgement 466, master storage node 300 may then acknowledge completion of the write request 468 to volume client 330.

Please note, that previous discussions and illustrations are not intended to be limiting as to the various other schemes and/or protocols to implement optimized write performance during snapshot operations. For example, various messages may be combined, such as buffer request 402 and forwarding of the write request 408. The timing of performing various operations may be different, such as the unmodified data chunk may be stored in the in-memory volume snapshot buffer 414 once the write request is received at master storage node 300, whether prior to sending the buffer request 402, or after receiving acknowledgment of the buffer request 406.

Figure 5A:
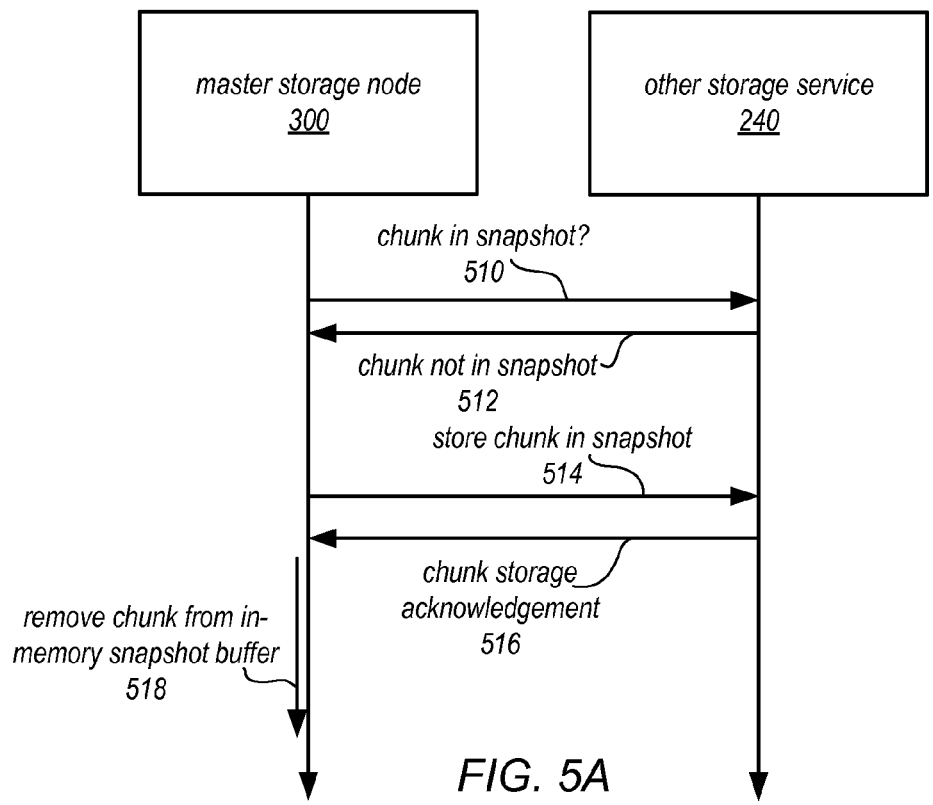
FIGS. 5A and 5B are block diagrams illustrating interactions between master storage nodes and slave storage nodes performing snapshot operations to copy data chunks from an in-memory volume snapshot buffer to remote snapshot storage, according to some embodiments.
Figure 5B:
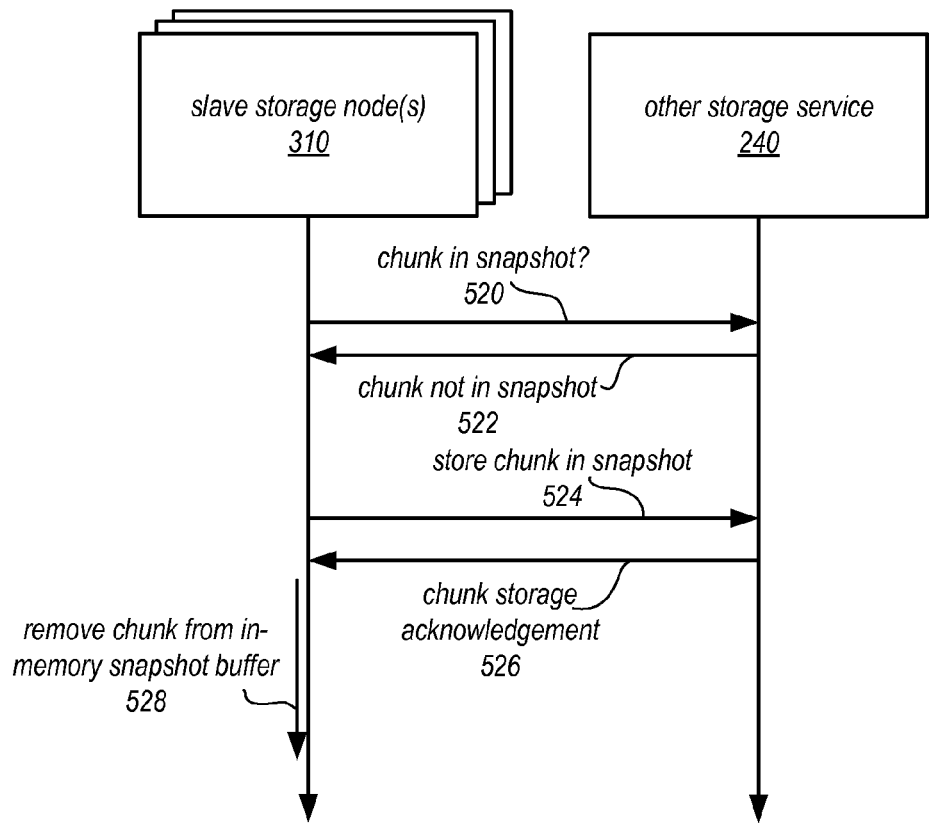

FIGS. 5A and 5B are a block diagrams illustrating interactions master storage nodes and slave storage nodes performing snapshot operations to copy data chunks from an in-memory volume snapshot buffer to remote snapshot storage, according to some embodiments. Either and/or both master and slave storage nodes may perform snapshot operations for a same data volume. These snapshot operations may occur asynchronously both from the occurrence of writes that are received and completed at the master and storage nodes, but also may be performed asynchronously (or independently) from each other. For example, FIG. 5A illustrates communications between master storage node 300 and other storage service 240 maintaining a remote snapshot data store for a data volume. Master storage node 300 may communicate with other storage service 240 via an application programming interface (API) or other protocol such as may be provided by other storage service 240.

In various embodiments, master storage node 300 may send an initial query 510 to determine if a snapshot to be sent from an in-memory volume snapshot buffer is already stored in other storage service 240. If, yes, then the data chunk may be removed from the in-memory volume snapshot buffer. As illustrated in FIG. 5B, if the data chunk is not in the snapshot 512, then master storage node 300 may send a request to store the data chunk in the snapshot 514 to other storage service 240. If master storage node 300 receives an acknowledgment 516 of the data chunk stored in other storage service 240, then the data chunk may be removed from the in-memory volume snapshot buffer 518. If, however, no acknowledgment is received, in some embodiments, master storage node 300 may send another storage request 514 for the data chunk repeatedly until an acknowledgement 516 is received.

Similar to master storage node 300, slave storage node(s) 310 may communicate with other storage service 240 via an application programming interface (API) or other protocol such as may be provided by other storage service 240. Slave storage node(s) 310 may send an initial query 520 to determine if a snapshot to be sent from an in-memory volume snapshot buffer is already stored in other storage service 240. If, yes, then the data chunk may be removed from the in-memory volume snapshot buffer. As illustrated in FIG. 5B, if the data chunk is not in the snapshot 522, then slave storage node(s) 310 may send a request to store the data chunk in the snapshot 524 to other storage service 240. If slave storage node(s) 310 receive an acknowledgment 526 of the data chunk stored in other storage service 240, then the data chunk may be removed from the in-memory volume snapshot buffer 528. If, however, no acknowledgment is received, in some embodiments, slave storage node(s) 310 may send another storage request 524 for the data chunk repeatedly until an acknowledgement 526 is received.

In some embodiments, master storage node 300 and/or slave storage node(s) 310 may not send an initial query to determine if particular data chunk is stored at other storage service 240. For example, if master storage node 300 and slave storage node(s) implement a durability scheme, such as discussed above with regard to FIG. 4, then the a data chunk in one in-memory volume snapshot buffer may be the same as a data chunk in another in-memory volume snapshot buffer. Thus, overwrites of data chunks replacing a same data chunk in the remote snapshot data store may occur without any data loss or consistency error in the snapshot. In some embodiments, either master storage node 300 or, or alternatively, slave storage node(s) 310 may perform sending data chunks from the in-memory volume snapshot buffer to the remote snapshot data store as part of the snapshot operation. For instance, slave storage node(s) 310 may send data chunks from the in-memory volume snapshot buffer as part of a failover mechanism, where the master storage node 300 has failed and/or otherwise lost data in the in-memory volume snapshot buffer at the master storage node 300.

Please note, that in some embodiments, the role of master and slave storage nodes may be assigned per data volume. For example, for one data volume maintained at a storage node, the storage node may serve as a master storage node. While for another data volume maintained at the same storage node, the storage node may serve as a slave storage node. Moreover, in some embodiments, write optimization may be implemented at a master only, slave only, or any other combination of multiple storage nodes. For example, in some embodiments, write optimization may be disabled at different storage nodes based on network utilization (e.g., heavy traffic) in order to lessen the amount of network traffic (e.g., by reducing the number of storage nodes that send data to the remote snapshot data store).

Figure 6:
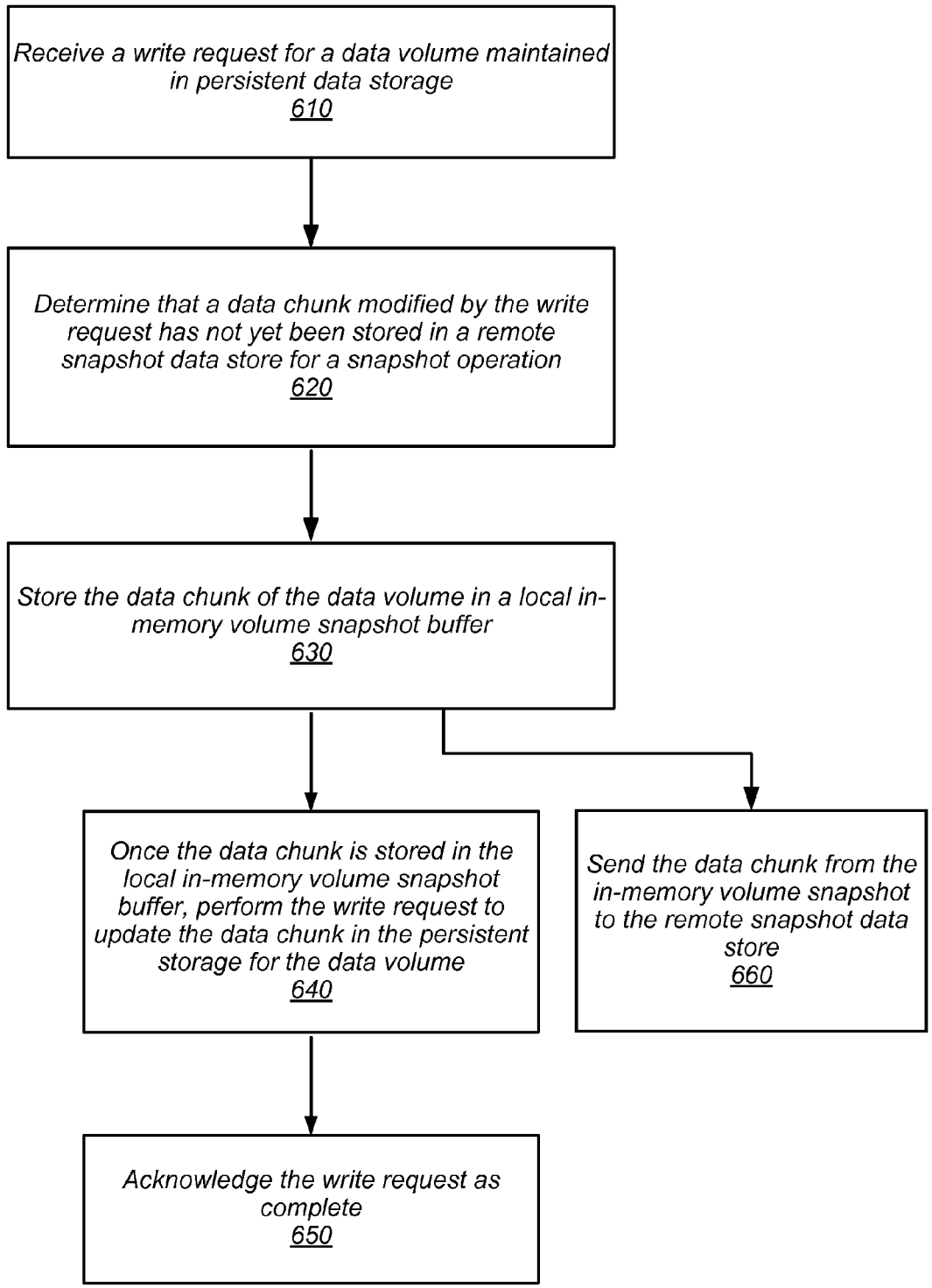
FIG. 6 is a high-level flowchart illustrating various methods and techniques for optimized write performance at block-based storage during snapshot operations, according to some embodiments.

The examples of optimized write performance at block-based storage during snapshot operations discussed above with regard to FIGS. 2-5B have been given in regard to a block-based storage service. Various other types or configurations of block-based storage may implement these techniques. For example, a client of block-based storage (application, operating system, or other component sending write requests for the data volume) may be implemented on a same computing system as the storage node performing a snapshot operation. Different configurations of storage nodes may also implement various numbers of replicas, mirroring, or other durability techniques that may implement write optimization during a snapshot operation performed by the variously configured storage nodes for the data volume. FIG. 6 is a high-level flowchart illustrating various methods and techniques for optimized write performance at block-based storage during snapshot operations, according to some embodiments. These techniques may be implemented using one or more storage nodes (or other system component that performs snapshot operations for a data volume in block-based storage) as described above with regard to FIGS. 2-5B.

As indicated at 610, a write request for a data volume maintained in persistent data storage for which a snapshot operation is currently performed may be received, in various embodiments. A snapshot operation may be an operation to capture a particular state of a data volume a particular point in time to create a snapshot of the data volume. A data volume may be divided in multiple data chunks (which may in turn be groups of smaller units such as data blocks on one or more block-based persistent storage devices). In other words, data chunks may be logical units of a logical whole, the data volume, maintained in one or more block-based storage devices, such as may be implemented at a storage node, storage server, or other block-based storage device that maintains one or more data volumes for clients. The snapshot operation may, in various embodiments, include multiple operations to transfer data chunks of the data volume to a remote snapshot data store (which may be another storage service or device, such as described above with regard to FIGS. 2-5B).

Figure 7:
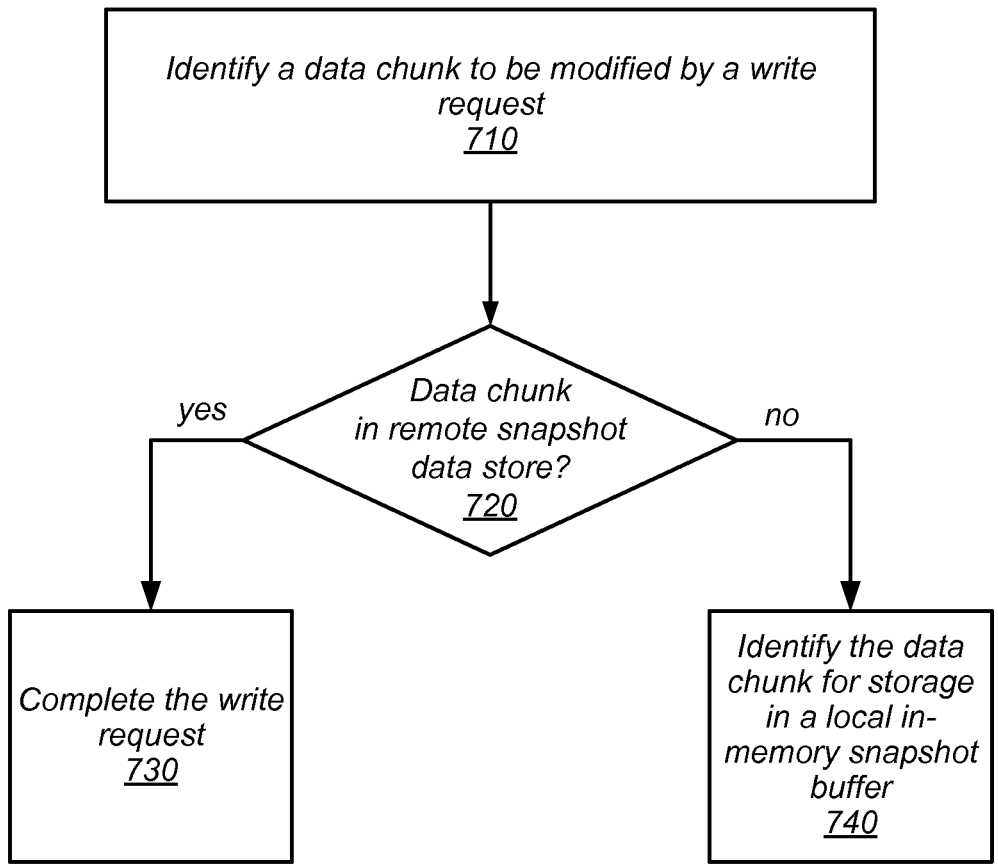
FIG. 7 is a high-level flowchart illustrating various methods and techniques for determining whether to store a data chunk in an in-memory volume snapshot buffer, according to some embodiments.

As data volumes may vary in size, with particularly large data volumes including many data chunks, a snapshot operation may impact other I/O operations directed to the data volume (e.g., write requests, read requests, etc.). For example, if a change is to be made to portion of data in a data chunk, and the data chunk has not yet been stored in the remote snapshot data store, then version of the data in the data chunk may need to be maintained until stored in the snapshot in order to preserve the snapshot of the data volume. Thus, a determination may be made as to whether a data chunk modified by the write request has not yet been stored in the remote snapshot data for the snapshot operation, as indicated at 620. FIG. 7 is a high-level flowchart illustrating various methods and techniques for determining whether to store a data chunk in an in-memory volume snapshot buffer, according to some embodiments.

As indicated at 710, a data chunk may be identified that is to be modified by a write request. A write request may be directed to a particular range, location, or portion of the data volume. An identified data chunk may include the particular range, location, or portion. Once identified, a determination may be made as to whether the data chunk is stored in the remote snapshot data, as indicated at 720. For example, a snapshot operation may maintain a listing, index, or other form of metadata describing the progress of a snapshot operation for a data volume. Data chunks already stored in the remote snapshot data store may be marked in the listing as stored. While those data chunks that have not yet been stored, may be identified as not stored. If the data chunk is stored in the remotes snapshot data store, then, as indicated by the positive exit from 720, the write request may be completed, as indicated at 730, and may be acknowledged as complete. If the data chunk is not stored in the remote snapshot, then the data chunk may be identified for storage in a local in-memory volume snapshot buffer, as indicated at 740.

Turning back to FIG. 6, the data chunk modified by the write request that has not yet been stored in the remote snapshot data store may, in various embodiments, be stored in a local in-memory volume snapshot buffer, as indicated at 630. As discussed below with regard to FIG. 8, a local in-memory volume snapshot buffer may be a portion of system memory (or other memory device with write and/or read speeds similar to system memory) for which an allocated portion of the memory (e.g., one or more slots or other type of allocated storage spaces) stores data chunks (e.g., a 256 MB in-memory volume snapshot buffer may allocate 64 slots for 4 MB data chunks). The in-memory volume snapshot buffer may then maintain the unmodified version of the data chunk until it may be stored in the remote snapshot data store as part of the snapshot operation. In some embodiments, the in-memory volume snapshot buffer may not be persistent storage (that is in the event of system failure, such as a power failure, data in the memory device may be lost). Alternatively, in some embodiments, the system memory may be persistent, such as NV-RAM, or other type of battery-backed RAM, as well as various other types of memristor based resistive random access memory (ReRAM), three-dimensional NAND technologies, Ferroelectric RAM, magnetoresistive RAM (MRAM), or any of various types of phase change memory (PCM) may be used to maintain the in-memory volume snapshot buffer.

In various embodiments, the data chunk may be written to available space in the in-memory volume snapshot buffer. Metadata, listing/mapping information, or other data describing the progress of the snapshot operation and/or the contents of the in-memory volume snapshot buffer may be updated in response to storing the data chunk. FIG. 9, discussed in detail below, describes various techniques for handling write requests that result in a data chunk that has not yet been sent to a remote snapshot data store and no available storage in the in-memory volume snapshot buffer to store the data chunk.

Once the data chunk is stored in the in-memory volume snapshot buffer, the write request may be performed to update the data chunk in the persistent storage (e.g., block-based storage devices) for the data volume, as indicated at 640. In response to performing the write request, the write request may be acknowledged as complete, as indicated at 650. For example, an acknowledgement message may be sent to a client that indicating that the write request is complete.

As indicated at 660, the data chunk may be sent from the in-memory volume snapshot data store to the remote snapshot data store asynchronously with regard to the performance of the write request and acknowledgment of the write request. For example, the data chunk may be sent to the remote snapshot data store, either before, during, or after the performance of the write request and/or acknowledgment of the write request as complete. FIG. 8, discussed in more detail below describes various methods and techniques for pushing data chunks stored in the in-memory volume snapshot buffer to the remotes snapshot data store.

In some embodiments, write requests may be received that are associated with a versions of data stored in particular data chunks that are prior in time to the snapshot operation in progress. In response to receiving such writes, affected data chunks stored in the in-memory volume snapshot buffer and/or persistent data storage may be updated to include the write request, and the write request may then be acknowledged in response to completion of the write request at the affected data chunks.

The techniques described above may be implemented upon multiple storage nodes, servers, systems, or devices which may maintain a data volume. As noted above, multiple replicas of a same data volume may forward write requests and acknowledgments of write requests to one another in order to provide greater durability for data volumes (such as described above in FIG. 4). Similarly, asynchronous snapshot operations (discussed above with regard to FIGS. 5A and 5B, and below with regard to FIG. 8) may be performed among the multiple replicas of a same data volume in order to complete a snapshot operation for a data volume.

Snapshot operations may in various embodiments operate independently from other operations performed with regard to a data volume. As noted above, performing a snapshot operation may occur as part of a background process at a storage node, while input/output operations (e.g., storing chunks in the in-memory volume snapshot buffer, performing write/read requests, acknowledging write requests) may be performed as part of a foreground process at a storage node. FIG. 8 is a high-level flowchart illustrating various methods and techniques for copying data chunks maintained in an in-memory volume snapshot buffer to a remote snapshot data store, according to some embodiments. Such techniques may be performed before, during, or after processing incoming read and/or write requests. Thus, maintaining data chunks in the in-memory volume snapshot buffer may allow for asynchronous transfer of data chunks to the remote snapshot data store without regard to acknowledging a write request.

As indicated at 810, a data chunk maintained in an in-memory volume snapshot buffer for a data volume to store in a remote snapshot data store as part of a snapshot operation may be identified. Various different schemes or techniques may be implemented to determine which data chunk should be identified for sending to the remote snapshot data store. For example, in some embodiments, data chunks maintained in-memory volume snapshot buffer may be selected according a first-in-first-out (FIFO), last-in-first-out (LIFO) or other ordering technique. In some embodiments, snapshot operations for all data chunks in a data volume may be performed according an ordering, and thus a particular data chunk in the in-memory volume snapshot buffer may be identified to be sent to a remote snapshot data store based on this ordering for the snapshot operation. For example, snapshot operations may send data chunks in a contiguous order (e.g., starting with the lowest or highest address range for a given data chunk and then selecting an adjacent data chunk), or may prioritize the selection of certain data chunks (e.g., those that are most frequently written (i.e., "hot") over those data chunks that may be accessed less frequently. In some embodiments, multiple storage nodes maintaining an in-memory volume snapshot buffer (e.g., a master and one or more slave storage nodes) may identify data chunks in the in-memory volume snapshot buffer for the data volume in a different order. For example, slave storage nodes may operate in FIFO manner, while a master storage node may identify data chunks to send in a LIFO manner.

In some embodiments, a check or other operation may be made to determine whether the data chunk is already stored in the remote snapshot data store prior to sending the identified data chunk, as indicated at 830. For example, a query, request, or other message may be sent to the data store identifying the data chunk to be sent and/or receiving back some indication from the remote snapshot data store from which it may be determined whether the data chunk is already present (and the correct version of the data chunk associated with the snapshot). If the data chunk is already stored in the data store, as indicated by the positive exit from 830, then the data chunk may be removed from the in-memory volume snapshot data store, as indicated at 840. If the data chunk is not present at the remote snapshot data store, as indicated at the negative exit from 830, then the data chunk may be sent to the remote snapshot data store, as indicated at 850, to be included in the snapshot. In various embodiments, a confirmation or acknowledgment may be received from the remote snapshot data store that a particular data chunk sent to the remote snapshot data store has been stored. The data chunk may then be removed from the in-memory volume snapshot buffer, as indicate at 860. Removing the data chunk may make the slot or space occupied by the data chunk available for storing an additional data chunk.

Data chunks, as previously noted, may not be removed from an in-memory volume snapshot buffer until determined to be stored in a remote snapshot data store, in some embodiments. Over time the number of data chunks stored in the in-memory volume snapshot buffer may grow, if, for example, the data chunks may not be sent to and stored in the remote snapshot data store at the same or faster rate than data chunks are stored in the in-memory volume snapshot buffer. FIG. 9 is a high-level flowchart illustrating various methods and techniques for handling write requests with a full in-memory volume snapshot buffer, according to some embodiments.

As indicated at 910, a write request may be received for a data volume maintained in persistent data storage for which a snapshot operation is currently being performed. As discussed above with regard to write requests in FIG. 6, a write request may write to, delete, or modify in any way a portion of the data volume. As a data volume may be divided up into multiple different data chunks representing ranges of data in the data volume, a data chunk modified by a write request may be identified. A determination may be made as to whether the data chunk has yet to be stored in the remote snapshot data store. For a data chunk that has not yet been sent to the remote snapshot data store as part of a snapshot operation, as indicated at 920, the data chunk may be identified to be stored in an in-memory volume snapshot buffer, so that the write request may be completed to the affected data chunk. However, as noted earlier, in some instances, the in-memory volume snapshot buffer may not have any available space. For example, in some embodiments, the in-memory volume snapshot buffer may allocate a fixed number of storage slots. Based on the number of available storage slots, or other free space allocated to store the identified data chunk, a determination may be made that the in-memory volume snapshot buffer has no available storage for the identified data chunk, as indicated by the negative exit at 930. In some embodiments, other demands on the memory device implementing the in-memory volume snapshot buffer may reduce the space allocated to the in-memory volume snapshot buffer. For example, if a storage node detects that more system memory is needed to perform other processes, storage space may be reallocated away from the in-memory volume snapshot buffer.

In response to determining that the in-memory volume snapshot buffer has no available storage space, various different actions may be taken. For example, in some embodiments, as indicated at 940, the write request may be blocked (e.g., stored in a buffer) until the identified data chunk is stored in the remote snapshot data store as part of the snapshot operation. Therefore, the write request may be delayed, not completed, and remain unacknowledged until the data chunk is sent to the remote snapshot data store and acknowledged as stored, in some embodiments. Other write requests for other data chunks that have already been stored in the remote snapshot data store may, in some embodiments, be completed and acknowledged, as indicated at 950. Alternatively, all write requests may be blocked (delayed, not completed, and unacknowledged) until the write request for the data chunk that remains to be stored in the remote snapshot data store is complete. As also indicted at 940, in some embodiments, the write request may be blocked until a storage slot becomes available in the in-memory volume storage buffer and then completed, such as described above with regard to FIG. 6. In some embodiments blocking may occur until the sooner of either a storage slot in the in-memory volume snapshot buffer becomes available or the data chunk is sent to the remote snapshot data store.

In some embodiments, instead of blocking a write request that modifies a data chunk that has not yet been stored as part of a snapshot operation for a data volume, the snapshot operation itself may be aborted. For multiple storage nodes implementing in-memory volume snapshot buffers for a same data volume, even one full in-memory volume snapshot buffer may trigger the abortion of a snapshot operation for a data volume. Similar to the example given above, a selection may be made between multiple different techniques to handle such a write request. For example, if the snapshot operation is completed above some threshold (e.g., 95%), then the snapshot operation may complete and the write may be blocked. If, however, the snapshot operation is below the threshold (e.g., 80%), then the snapshot operation may be aborted and the write completed and acknowledged without blocking the write request. Determining which handling technique for an in-memory volume snapshot buffer with no available storage space may be selected or identified by a user (e.g., a block-based storage service control panel) or other type of agreement or setting agreed to by a user/owner of a data volume persisted at a storage node, in some embodiments.

Figure 10:
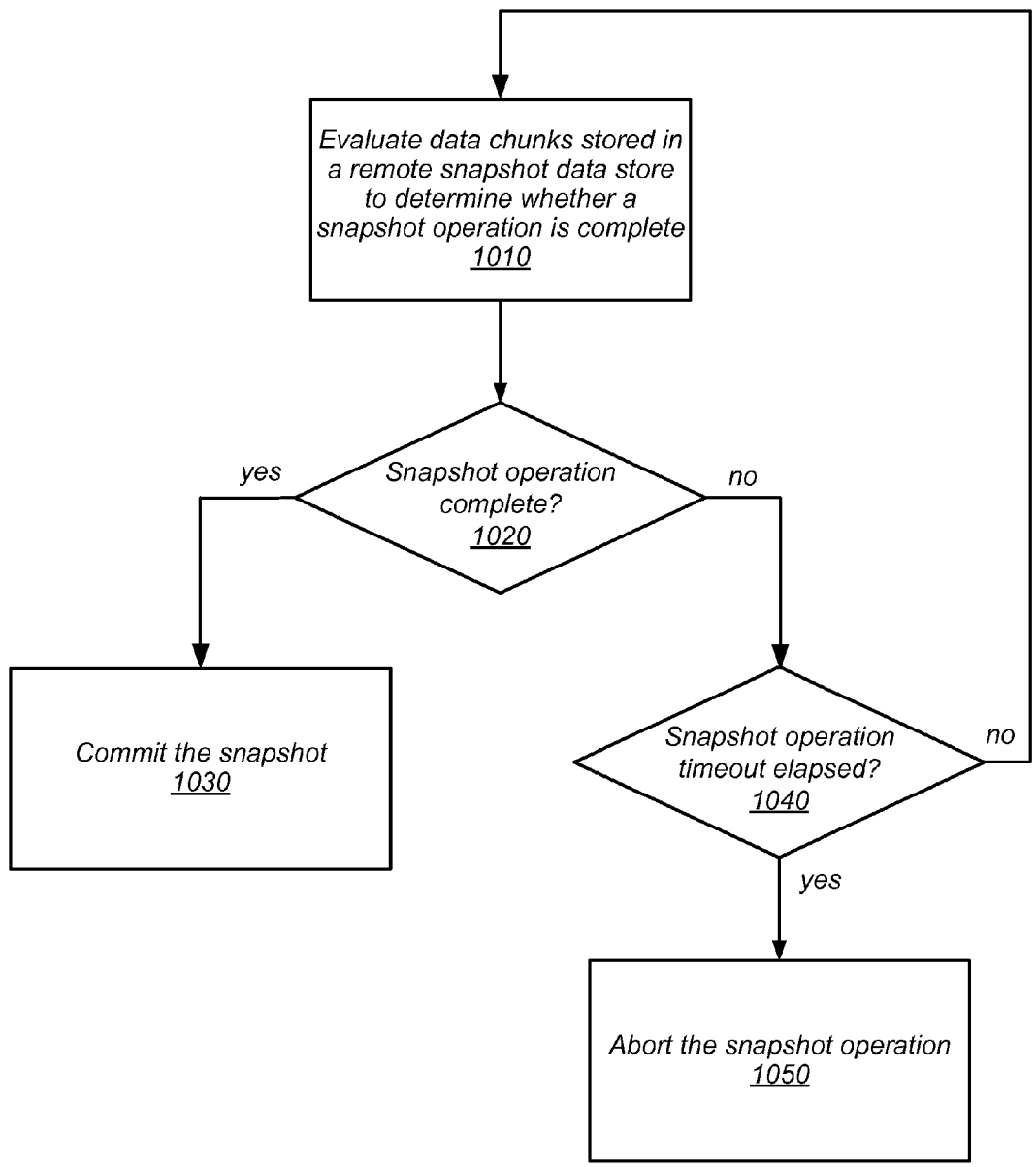
FIG. 10 is a high-level flowchart illustrating various methods and techniques for determining whether a snapshot operation for which optimized write requests are performed is complete, according to some embodiments.

As discussed above with regard to FIG. 8, data chunks maintained in an in-memory volume snapshot buffer are sent asynchronously to remote snapshot data storage with regard to acknowledging completion of write requests. Once a data chunk is removed from an in-memory volume snapshot buffer, the data chunk may not be recoverable at the storage node (as the data chunk is stored in the in-memory volume buffer because it has been modified at the storage node). This is not problematic if the snapshot at the remote snapshot data store maintains a copy of the data chunk. However, if the snapshot does not maintain a copy, then the snapshot may not be able to be completed. FIG. 10 is a high-level flowchart illustrating various methods and techniques for determining whether a snapshot operation for which optimized write requests are performed is complete, according to some embodiments.

As indicated at 1010, an evaluation of data chunks stored in a remote snapshot data store may be performed to determine whether a particular snapshot operation is complete. For example, a list or other set of metadata may be maintained for the data volume, indicating data chunks that were stored in the in-memory volume buffer. The listing information, or metadata, may also include the particular snapshot of the data volume with which data chunks are associated. For example, multiple snapshot operations may be ongoing for a particular data volume (for different point in time versions of the data volume). Data chunks may be stored in the in-memory volume snapshot buffer that are associated with these different snapshots.

Based on the listing of data chunks associated with a particular snapshot, the data chunks stored in the remote snapshot data store may be checked to determine if the data chunk once stored in the in-memory volume snapshot buffer is present in the remote snapshot data store. For instance, a storage node (e.g., a master storage node), control plane, or other system component that determines whether a snapshot operation is complete may send query messages to the remote snapshot data store that ask for version information for particular data chunks in order to be compared with version information maintained for the data chunks in the snapshot, and thus may take inventory of the data chunks stored in the snapshot in the remote snapshot data store. If the version information does not match for a particular data chunk, then it may be determined that the particular data chunk in the remote snapshot data store is not the correct data chunk (or is not present). In some embodiments, the remote snapshot data store itself may be able to confirm or deny the existence of data chunk, whether or not it matches (e.g., a particular version), or whether the data chunk has been modified. Evaluating the completeness of a snapshot operation may be performed after storage nodes may be performed after all data chunks for the data volume are sent to the remote snapshot data store, in some embodiments.

As indicated from the positive exit from 1020, if the snapshot operation is complete, the snapshot may be committed, as indicated at 1030. Any post-commit processing for a snapshot may then be performed, such as notifying a client that the snapshot operation is complete, updating any data volume information, such as a listing of snapshots, or any other operation that is performed with respect to complete snapshots.

As indicated from the negative exit from 1030, if the snapshot operation is not complete, a check may be performed to determine whether a snapshot time operation timeout has elapsed, as indicated at 1040. For example, in some embodiments, a time limit or timeout may be implemented for a given snapshot operation. If a snapshot operation is not determined to be complete within the given time period, then the snapshot operation may be aborted, as indicated 1050. For instance, at the commencement of a snapshot operation a timer may be started, which may then abort the snapshot operation if the timer exceeds a timeout threshold for the snapshot operation. Alternatively, in some embodiments, a timer may be started after the snapshot operation is first determined to not be complete (as illustrated in FIG. 10). For instance, the snapshot operation itself may take as long as necessary, but once all of the data chunks for a data volume are sent to the remote snapshot data store, and an evaluation of the snapshot operation that indicates that the snapshot operation is not complete, the timer may start (e.g., once all data chunks, there may be a 24 hour window for the snapshot stored in the remote snapshot data store to become complete).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may be configured to implement the functionality described herein (e.g., the functionality of various servers, storage nodes, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 11:
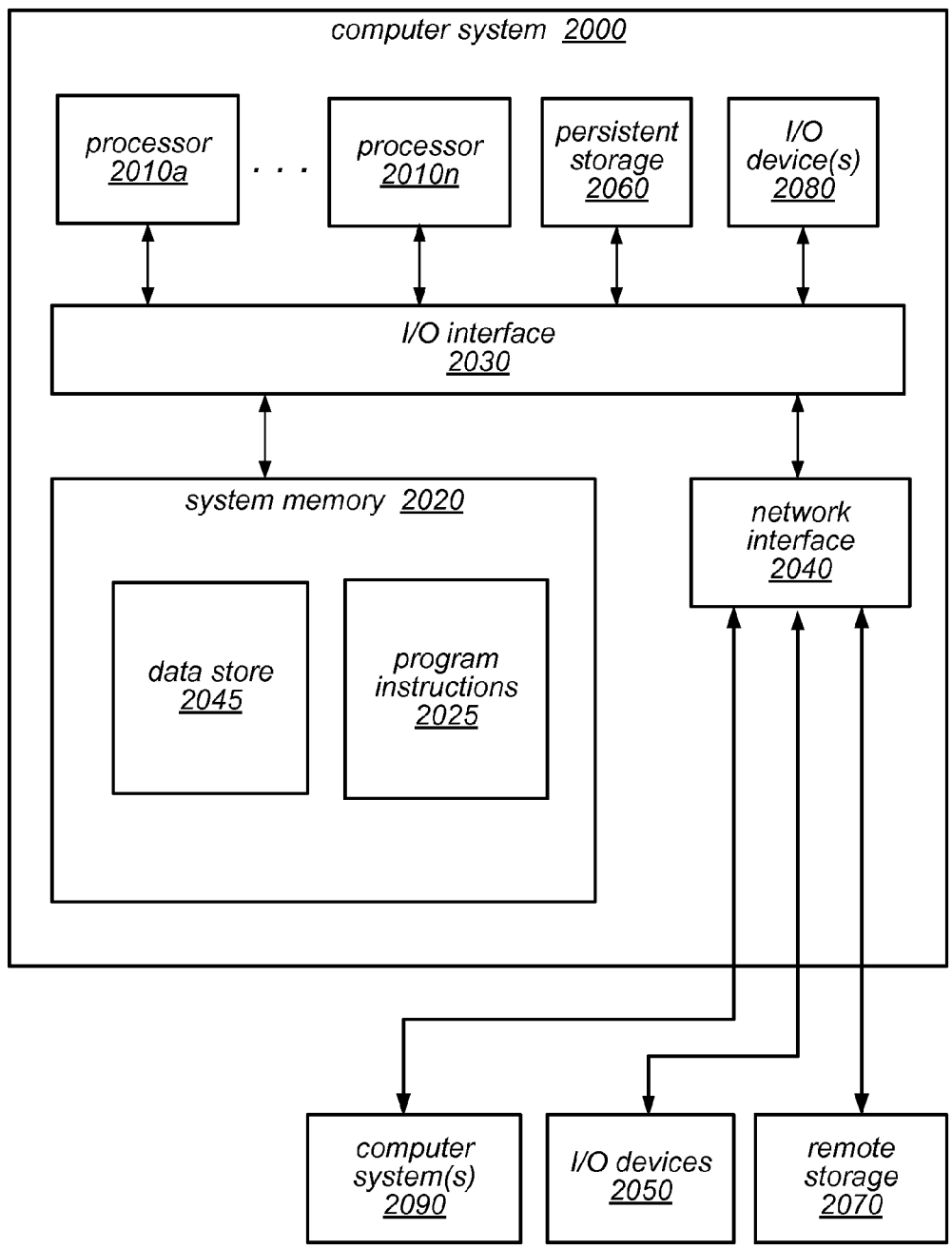
FIG. 11 is a block diagram illustrating an example computing system, according to some embodiments.

Embodiments of optimized write performance at block-based storage during snapshot operations as described herein may be executed on one or more computer systems, which may interact with various other devices. FIG. 11 is a block diagram illustrating an example computer system, according to various embodiments. For example, computer system 2000 may be configured to implement storage and/or compute nodes of a compute cluster, a data stores, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, block-based storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory, such as non-volatile random access memory (NV RAM)). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a storage node, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090, for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A storage node, comprising:
one or more persistent block storage devices configured to maintain a data volume, wherein the data volume comprises a plurality of data chunks;
a local in-memory volume snapshot buffer configured to store data chunks;
the storage node configured to:
receive a write request for the data volume, wherein a snapshot operation storing the plurality of data chunks at a remote snapshot data store is in progress for the data volume;
determine that a data chunk of the plurality of data chunks that is to be modified as part of the write request is not yet stored in the remote snapshot data store for the snapshot operation;
in response to said determining:
store the data chunk in the in-memory volume snapshot buffer;
once the data chunk is stored in the in-memory volume snapshot buffer, perform the write request to update the data chunk in the one or more block storage devices maintaining the data volume; and
in response to performing the write request, acknowledge the write request as complete.

2. The system of claim 1,
wherein the storage node is a master storage node for the data volume, wherein one or more slave storage nodes store replicas of the data volume;
wherein the master storage node is further configured to:
in response to receiving the write request, send the write request to the one or more slave storage nodes;
in response to receiving acknowledgments of completion of the write request from the one or more slave storage nodes, perform said acknowledging completion of the write request,
wherein each of the one or more slave storage nodes is configured to:
receive the write request for the data volume from the master storage node;
store the data chunk in a respective local in-memory volume snapshot buffer;
once the data chunk is stored in the respective in-memory volume snapshot buffer, perform the write request to update the data chunk in a persistent data storage for the respective replica of the data volume; and
in response to performing the write request, acknowledge the write request as complete to the master storage node.

3. The system of claim 1, wherein the in-memory volume snapshot buffer stores one or more other data chunks of the plurality of data chunks in addition to the data chunk, and wherein the storage node is further configured to:
identify a particular data chunk that is maintained in the in-memory volume snapshot buffer;
send the particular data chunk to the remote snapshot data store for storage; and
in response to determining that the particular data chunk is stored at the remote snapshot data store, remove the data chunk from the in-memory volume snapshot buffer in order to make storage space maintaining the particular data chunk available for maintaining another data chunk.

4. The system of claim 1, wherein the storage node is one of a plurality of storage nodes implementing a network-based, block-based storage service, wherein each of the plurality of storage nodes maintains different ones of a plurality of data volumes maintained at the block-based storage service for a plurality of clients.

5. A method, comprising:
performing, by one or more computing devices:
receiving a write request for a data volume comprising a plurality of data chunks stored in persistent data storage;
determining that a data chunk modified by the write request has not yet been stored in a remote snapshot data store for a snapshot operation;
in response to said determining:
storing the data chunk in a local in-memory volume snapshot buffer for the data volume;
once the data chunk is stored in the in-memory volume snapshot buffer, performing the write request to update the data chunk in the persistent data storage for the data volume; and
in response to performing the write request, acknowledging the write request as complete.

6. The method of claim 5, wherein the in-memory volume snapshot buffer stores one or more other data chunks of the plurality of data chunks in addition to the data chunk, and wherein the method further comprises:
identifying a particular data chunk that is maintained in the in-memory volume snapshot buffer;
sending the particular data chunk to the remote snapshot data store for storage; and
in response to determining that the particular data chunk is stored at the remote snapshot data store, removing the data chunk from the in-memory volume snapshot buffer in order to make storage space in the in-memory volume snapshot buffer available for storing another data chunk.

7. The method of claim 6, wherein the particular data chunk is the data chunk, wherein the data chunk is sent to the remote snapshot data store asynchronously with respect to the performance of said acknowledging the write request as complete.

8. The method of claim 5, further comprising:
receiving another write request for the data volume during performance of the snapshot operation;
determining that another data chunk modified by the other write request has not yet been stored in the remote snapshot data store for the snapshot operation;
determining that the in-memory volume snapshot buffer has no available storage for the other data chunk; and
in response to determining that the in-memory volume snapshot buffer has no available storage for the other data chunk, blocking performance of the other write request until:
the other data chunk is stored in the remote snapshot data store as part of the snapshot operation; or
storage becomes available for the other data chunk in the in-memory volume snapshot buffer.

9. The method of claim 5, further comprising:
receiving another write request for the data volume during performance of the snapshot operation;
determining that another data chunk modified by the other write request has not yet been stored in the remote snapshot data store for the snapshot operation;
determining that the in-memory volume snapshot buffer has no available storage for the other data chunk;
in response to determining that the in-memory volume snapshot buffer has no available storage for the other data chunk:

aborting the snapshot operation;
performing the other write request to update the other data chunk; and
acknowledging the other write request as complete.

10. The method of claim 5, further comprising:
evaluating one or more data chunks stored in the remote snapshot data store as part of the snapshot operation in order to determine that the snapshot operation is not complete;
determining that a snapshot operation timeout for the snapshot operation has elapsed; and
in response to determining that the snapshot operation is not complete and that the snapshot operation timeout has elapsed, aborting the snapshot operation.

11. The method of claim 5, wherein the data volume is persisted at a master storage node and a respective replica at one or more slave storage nodes, wherein said receiving, said determining, said storing, said performing, and said acknowledging the write request is performed by the master storage node and the one or more slave storage nodes for the write request, and wherein the method further comprises:
performing, by the master storage node:
in response to receiving the write request, sending the write request to the one or more slave storage nodes; and
in response to receiving acknowledgments of completion of the write request from the one or more slave storage nodes, performing said storing the data chunk in the in-memory volume snapshot buffer, said performing the write request to update the data chunk, and said acknowledging completion of the write request.

12. The method of claim 5, wherein the one or more computing devices together implement a storage node, wherein the storage node is one of a plurality of storage nodes implementing a network-based block-based storage service, wherein each of the plurality of storage nodes maintains different ones of a plurality of data volumes maintained at the block-based storage service for a plurality of clients.

13. A non-transitory, computer-readable storage medium, storing program instructions that when executed by a plurality of computing devices cause the plurality computing devices to implement:
receiving a write request for a data volume comprising a plurality of data chunks stored in persistent data storage;
determining that a data chunk modified by the write request has not yet been stored in a remote snapshot data store for a snapshot operation;
in response to said determining:
storing the data chunk in a local in-memory volume snapshot buffer for the data volume;
once the data chunk is stored in the in-memory volume snapshot buffer, performing the write request to update the data chunk in the persistent data storage for the data volume; and
in response to performing the write request, acknowledging the write request as complete.

14. The non-transitory, computer-readable storage medium of claim 13, wherein the data volume is persisted at a master storage node and a respective replica at one or more slave storage nodes, wherein said receiving, said storing, said performing, and said acknowledging the write request is performed by the master storage node and the one or more slave storage nodes for the write request, and wherein the further cause the one or more computing devices to implement:
performing, by the master storage node:
in response to receiving the write request, sending the write request to the one or more slave storage nodes; and
in response to receiving acknowledgments of completion of the write request from the one or more slave storage nodes, performing said storing the data chunk in the in-memory volume snapshot buffer, said performing the write request to update the data chunk, and said acknowledging completion of the write request.

15. The non-transitory, computer-readable storage medium of claim 13, wherein the program instructions further cause the one or more computing devices to implement:
identifying a particular data chunk that is maintained in the in-memory volume snapshot buffer;
sending the particular data chunk to the remote snapshot data store for storage; and
in response to determining that the particular data chunk is stored at the remote snapshot data store, removing the data chunk from the in-memory volume snapshot buffer in order to make a storage slot available in the in-memory volume snapshot buffer available for maintaining another data chunk.

16. The non-transitory, computer-readable storage medium of claim 14, wherein said receiving, said determining, said storing, said performing, and said acknowledging are performed as part of a foreground process, and wherein said identifying, said sending, and said removing are performed as part of a background process.

17. The non-transitory, computer-readable storage medium of claim 14, wherein the program instructions further cause the one or more computing devices to implement:
receiving another write request for the data volume during performance of the snapshot operation;
determining that another data chunk modified by the other write request has not yet been stored in the remote snapshot data store for the snapshot operation;
determining that the in-memory volume snapshot buffer has no available storage for the other data chunk; and
in response to determining that the in-memory volume snapshot buffer has no available storage for the other data chunk, blocking performance of the other write request until the other data chunk is stored in the remote snapshot data store as part of the snapshot operation.

18. The non-transitory, computer-readable storage medium of claim 14, wherein the program instructions further cause the one or more computing devices to implement:
evaluating one or more data chunks stored in the remote snapshot data store as part of the snapshot operation in order to determine that the snapshot operation is not complete;
determining that a snapshot operation timeout for the snapshot operation has elapsed; and
in response to determining that the snapshot operation is not complete and that the snapshot operation timeout has elapsed, aborting the snapshot operation.

19. The non-transitory, computer-readable storage medium of claim 15, wherein the in-memory volume snapshot buffer is a non-volatile random access memory (NV-RAM) device, wherein in the event of a failure of the non-volatile random access memory (NV-RAM) one or more data chunks including the data chunk are persisted.

20. The non-transitory, computer-readable storage medium of claim 15, wherein the one or more computing devices together implement a storage node, wherein the storage node is one of a plurality of storage nodes implementing a network-based block-based storage service, wherein each of the plurality of storage nodes maintains different ones of a plurality of data volumes maintained at the block-based storage service for a plurality of clients.

* * * * *